US012730773B2

(12) United States Patent
Thomas

(10) Patent No.: US 12,730,773 B2
(45) **Date of Patent: *Sep. 8, 2026**

(54) PCI EXPRESS TO PCI EXPRESS BASED LOW LATENCY INTERCONNECT SCHEME FOR CLUSTERING SYSTEMS

(71) Applicant: Mammen Thomas, Seattle, WA (US)

(72) Inventor: Mammen Thomas, Seattle, WA (US)

( * ) Notice: Subject to any disclaimer, the term of this patent is extended or adjusted under 35 U.S.C. 154(b) by 326 days.

This patent is subject to a terminal disclaimer.

(21) Appl. No.: 18/205,515

(22) Filed: Jun. 3, 2023

(65) Prior Publication Data

US 2023/0315674 A1 Oct. 5, 2023

Related U.S. Application Data

(63) Continuation of application No. 17/858,083, filed on Jul. 6, 2022, now abandoned, which is a continuation of application No. 17/523,878, filed on Nov. 10, 2021, now abandoned, which is a continuation of application No. 15/175,800, filed on Jun. 7, 2016, now Pat. No. 11,194,754, which is a continuation of application No. 14/588,937, filed on Jan. 3, 2015, now Pat. No. 9,519,608, which is a continuation of application No. 13/441,883, filed on Apr. 8, 2012, now abandoned, which is a continuation of application No. 11/242,463, filed on Oct. 4, 2005, now Pat. No. 8,189,603.

(51) Int. Cl.

| | |
|---|---|
| ***G06F 13/42*** | (2006.01) |
| ***G06F 13/40*** | (2006.01) |
| ***H04L 49/40*** | (2022.01) |

(52) U.S. Cl.
CPC ...... *G06F 13/4282* (2013.01); *G06F 13/4022* (2013.01); *G06F 13/4221* (2013.01); *H04L 49/40* (2013.01); *G06F 2213/0026* (2013.01)

(58) Field of Classification Search
CPC ............ G06F 13/4282; G06F 13/4022; G06F 13/4221; G06F 2213/0026; H04L 49/40
See application file for complete search history.

(56) References Cited

U.S. PATENT DOCUMENTS

| | | | |
|---|---|---|---|
| 5,805,597 | A | 9/1998 | Edam |
| 6,108,739 | A | 8/2000 | James et al. |
| 6,362,908 | B1 | 3/2002 | Kimbrough et al. |
| 6,594,612 | B2 | 7/2003 | Moch |

(Continued)

*Primary Examiner* — Chirag G Shah

(57) ABSTRACT

PCI Express (PCIE) is an IO interconnect standard that is implemented as a tree network with a root complex connecting to a CPU as the root node for use inside the computer for connecting to peripheral devices. Currently PCIE has achieved stability such that PCIE can be used as a basis for other applications. A PCIE based scheme inter-connecting multiple PCIE enabled computer systems each having at least one PCIE root complex controlling at least a PCIE bus, enabling the scalability of PCIE architecture to be applied for data transport between the connected system cluster is proposed. The interconnection uses an outbound port enabled for system interconnection on the PCIE bus of each PCIE enabled computer connecting to one inbound port on an independently programmable network switch having a plurality of inbound ports. The interconnection is using PCIE protocol for data transfer within the cluster.

5 Claims, 2 Drawing Sheets

(56) References Cited

U.S. PATENT DOCUMENTS 6,615,306 B1 9/2003 Ajnovic
7,000,037 B2 2/2006 Rabinovitz et al.
7,062,581 B2 6/2006 Brocco et al.
7,145,866 B1 12/2006 Ting et al.
7,457,322 B1 11/2008 Flood et al.
8,189,603 B2* 5/2012 Thomas .................. H04L 49/40 370/401
8,291,145 B2 10/2012 Riley
9,519,608 B2* 12/2016 Thomas .................. H04L 49/40
11,194,754 B2* 12/2021 Thomas .................. H04L 49/40
2002/0111753 A1 8/2002 Moch
2003/0099247 A1 5/2003 Toutant et al.
2003/0123461 A1 7/2003 Riley
2003/0158940 A1 8/2003 Leigh
2003/0188079 A1 10/2003 Singhal et al.
2004/0039986 A1 2/2004 Solomon
2004/0083323 A1 4/2004 Rabinovitz et al.
2004/0083325 A1 4/2004 Rabinoviz et al.
2004/0268015 A1* 12/2004 Pettey .................. H04L 49/602 710/313
2005/0053060 A1 3/2005 Petty et al.
2005/0102454 A1 5/2005 McAfee et al.
2005/0125590 A1 6/2005 Li et al.
2005/0160212 A1 6/2005 Caruk
2005/0147119 A1 7/2005 Tofano
2005/0215085 A1 9/2005 Mehta et al.
2005/0220114 A1* 10/2005 Romano ............... H04L 47/527 370/412
2005/0238035 A1* 10/2005 Riley ...................... H04L 49/35 370/401
2005/0240713 A1 10/2005 Wu et al.
2005/0246460 A1 11/2005 Stufflebeam
2005/0270988 A1 12/2005 DeHaemer
2006/0004837 A1* 1/2006 Genovker ............... H04L 45/28 707/999.102
2006/0015537 A1 1/2006 Marks
2006/0050693 A1 3/2006 Bury et al.
2006/0050707 A1 3/2006 Sterin
2006/0050722 A1 3/2006 Bury et al.
2006/0083257 A1 4/2006 Price et al.
2006/0101179 A1 5/2006 Lee et al.
2006/0101185 A1 5/2006 Kapoor et al.
2006/0106955 A1 5/2006 Wang et al.
2006/0114918 A1* 6/2006 Ikeda ...................... H04L 45/02 370/408
2006/0126612 A1 6/2006 Sandy et al.
2006/0143311 A1 8/2006 Madukkarumukumana
2006/0206655 A1 9/2006 Chappell et al.
2006/0209863 A1 9/2006 Arndt et al.
2006/0212731 A1 9/2006 Han et al.
2006/0227768 A1 10/2006 Sauber et al.
2006/0242333 A1 10/2006 Johnsen et al.
2006/0251096 A1 11/2006 Metsker
2006/0259656 A1 11/2006 Sullivan
2007/0019637 A1 1/2007 Boyd et al.
2007/0019677 A1 1/2007 Wang et al.
2007/0047536 A1 3/2007 Scherer et al.
2007/0073959 A1 3/2007 McAfee et al.
2007/0198763 A1 8/2007 Suzuki et al.
2007/0204095 A1 8/2007 Sandy et al.
2008/0034147 A1 2/2008 Stubbs et al.
2008/0052431 A1 2/2008 Freking et al.
2008/0147959 A1 6/2008 Freimuth et al.
2008/0209099 A1 8/2008 Kloppener et al.
2009/0049222 A1 2/2009 Lee et al.
2010/0125653 A1 5/2010 Cherian et al.
2011/0010481 A1 1/2011 Hamadani et al.
2011/0153906 A1 6/2011 Suzuki et al.
2011/0202701 A1 8/2011 Maitra
2011/0246686 A1 9/2011 Cavanagh et al.
2013/0103881 A1 4/2013 Hamadani et al.
2013/0254487 A1 9/2013 Tanaka et al.
2014/0173167 A1 6/2014 Choi

* cited by examiner

Interconnected Multi-System Cluster
(with 8 interconnected systems)

A Cluster enlargement using switch to switch interconnect

PCI EXPRESS TO PCI EXPRESS BASED LOW LATENCY INTERCONNECT SCHEME FOR CLUSTERING SYSTEMS

CROSS REFERENCE TO RELATED APPLICATIONS

This application is a continuation of U.S. patent application Ser. No. 17/858,083 filed on Jul. 6, 1922, claims priority to U.S. patent application Ser. No. 17/523,878, titled "PCI Express. to PCI Express based low latency interconnect scheme for clustering systems" filed on Nov. 10, 2021 claims priority to U.S. patent application Ser. No. 15/175,800 titled "PCI Express. to PCI Express based low latency interconnect scheme for clustering systems" filed on Jun. 7, 2016, which issued as U.S. Pat. No. 11,194,754 od Dec. 7, 2021 which is a continuation of U.S. application Ser. No. 14/588,937 titled "PCI Express. to PCI Express based low latency interconnect scheme for clustering systems' filed on Jan. 3, 2015 which issued as a U.S. Pat. No. 9,519,708 on Dec. 13, 2016 is a continuation of U.S. patent application Ser. No. 13/441,883 titled "PCI Express to PCI Express based low latency interconnect scheme for clustering systems" filed on Apr. 8, 2012, currently abandoned, which is a continuation of U.S. patent application Ser. No. 11/242,463 titled "PCI Express to PCI Express based low latency interconnect scheme for clustering systems" filed on Oct. 4, 2005 which issued as U.S. Pat. No. 8,189,603 on May 29, 2012, all of which have a common inventor, and are hereby incorporated by reference for all that they contain.

TECHNICAL FIELD

The invention generally relates to providing high speed interconnect between systems within an interconnected cluster of systems and specifically relates to providing high speed interconnect between root complexes controlled PCIE bus of PCIE enabled systems within an interconnected cluster of PCIE enabled systems, each PCIE enabled system having at least a root complex controlling a PCIE bus of the PCIE enabled system.

BACKGROUND AND PRIOR ART

The need for high speed and low latency cluster interconnect scheme for data and information transport between systems have been recognized as a limiting factor to achieving high speed operation in clustered systems and one needing immediate attention to resolve. The growth of interconnected and distributed processing schemes have made it essential that high speed interconnect schemes be defined and established to provide the speeds necessary to take advantage of the high speeds being achieved by data processing systems and enable faster data sharing between interconnected systems.

There are today interconnect schemes that allow data transfer at high speeds, the most common and fast interconnect scheme existing today is the Ethernet connection allowing transport speeds from 10 MB to as high as 10 GB/sec. TCP/IP protocols used with Ethernet have high over-head with inherent latency that make it unsuitable for some distributed applications.

Further TCP/IP protocol tends to drop data packets under high traffic congestion times, which require resend of the lost packets which cause delays in data transfer and is not acceptable for high reliability system operation. Recent developments in optical transport also provide high speed interconnect capability. Efforts are under way in different areas of data transport to reduce the latency of the interconnect as this is a limitation on growth of the distributed computing, control and storage systems. All these require either changes in transmission protocols, re-encapsulation of data or modulation of data into alternate forms with associated delays increase in latencies and associated costs.

DESCRIPTION

What is Proposed

PCI Express (PCIE) has achieved a prominent place as the I/O interconnect standard for use inside computers, processing system and embedded systems that allow serial high speed data transfer to and from peripheral devices. The typical PCIE provides 2.5-3.8 GB transfer rate per link (this may change as the standard and data rates change). The PCIE standard is evolving fast, becoming faster and starting become firm and used within more and more systems. Typically each PCIE based system has a root complex which controls all connections and data transfers to and from connected peripheral devices through PCIE peripheral end points or peripheral modules. What is disclosed is the use of PCIE standard based peripherals enabled for interconnection to similar PCIE standard based peripheral connected directly using data links, as an interconnect between multiple systems, typically through one or more network switches. This interconnect scheme by using PCIE based protocols for data transfer over direct physical connection links between the PCIE based peripheral devices, (see FIG. 1), without any intermediate conversion of the transmitted data stream to other data transmission protocols or encapsulation of the transmitted data stream within other data transmission protocols, thereby reducing the latencies of communication between the connected PCI based systems within the cluster. The PCIE standard based peripheral enabled for interconnection at a peripheral end point of the system, by directly connecting using PCIE standard based peripheral to PCIE standard based peripheral direct data link connections to the switch, provides for increase in the number of links per connection as bandwidth needs of system interconnections increase and thereby allow scaling of the band width available within any single interconnect or the system of interconnects as required.

Some Advantages of the Proposed Connection Scheme:

1. Reduced Latency of Data transfer as conversion from PCIE to other protocols like Ethernet are avoided during transfer.
2. The number of links per connection can scale from X1 to larger numbers X32 or even X64 as PCIE capabilities increase to cater to the connection bandwidth needed. Minimum change in interconnect architecture is needed with increased bandwidth, enabling easy scaling with need.
3. Any speed increase in the link connection due to technology advance is directly applicable to the interconnection scheme.
4. Standardization of the PCIE based peripheral will make components easily available from multiple vendors, making the implementation of interconnect scheme easier and cheaper.
5. The PCIE based peripheral to PCIE based peripheral links in connections allow ease of software control and provide reliable bandwidth.

EXPLANATION OF NUMBERING AND LETTERING IN FIG. 1

(1) to (8): Number of Systems interconnected in FIG. 1 (9): Switch sub-system. (10): Software configuration and control input for the switch. (1*a*) to (8*a*): PCI Express based peripheral module (PCIE Modules) attached to systems. (1*b*) to (8*b*): PCI Express based peripheral modules (PCIE Modules) at switch. (1L) to (8L): PCIE based peripheral module to PCIE based peripheral module connections having n-links (n-data links)

EXPLANATION OF NUMBERING AND LETTERING IN FIG. 2

(12-1) and (12-2): clusters (9-1) and (9-2): interconnect modules or switch sub-systems. (10-1) and (10-2): Software configuration inputs (11-1) and (11-2): Switch to switch interconnect module in the cluster (11L): Switch to switch interconnection

DESCRIPTION OF INVENTION

PCI Express (PCIE) was developed as an IO interconnect standard that is implemented as a tree network with a root complex connecting to a CPU having one or more processors. The root complex acts as the root node for use inside the computer for connecting to peripheral devices. Currently PCIE has achieved stability such that PCIE can be used as a basis for other applications. A PCIE based scheme interconnecting multiple PCIE enabled computer systems each having at least one PCIE root complex controlling at least a PCIE bus, enabling the scalability of PCIE architecture to be applied for data transport between the connected system cluster is proposed.

The interconnection uses an outbound port enabled for system interconnection on the PCIE bus of each PCIE enabled computer connecting to one inbound port on an independently programmable network switch having a plurality of inbound ports. The interconnection is using PCIE protocol for data transfer within the cluster.

PCIE is a Bus standard for use inside the computer or embedded system enabling faster data transfers to and from peripheral devices. The standard is still evolving but has achieved a degree of stability such that other applications can be implemented using PCIE as basis. A PCIE based interconnect scheme to enable switching and inter-connection between multiple PCIE enabled systems each having its own PCIE root complex, such that the scalability of PCIE architecture can be applied to enable data transport between connected systems to form a cluster of systems, is proposed. These connected PCIE enabled systems can be any computing, control, storage or embedded systems. The scalability of the interconnect will allow the cluster to grow the bandwidth between the systems as they become necessary without changing to a different connection architecture.

Figure 1:
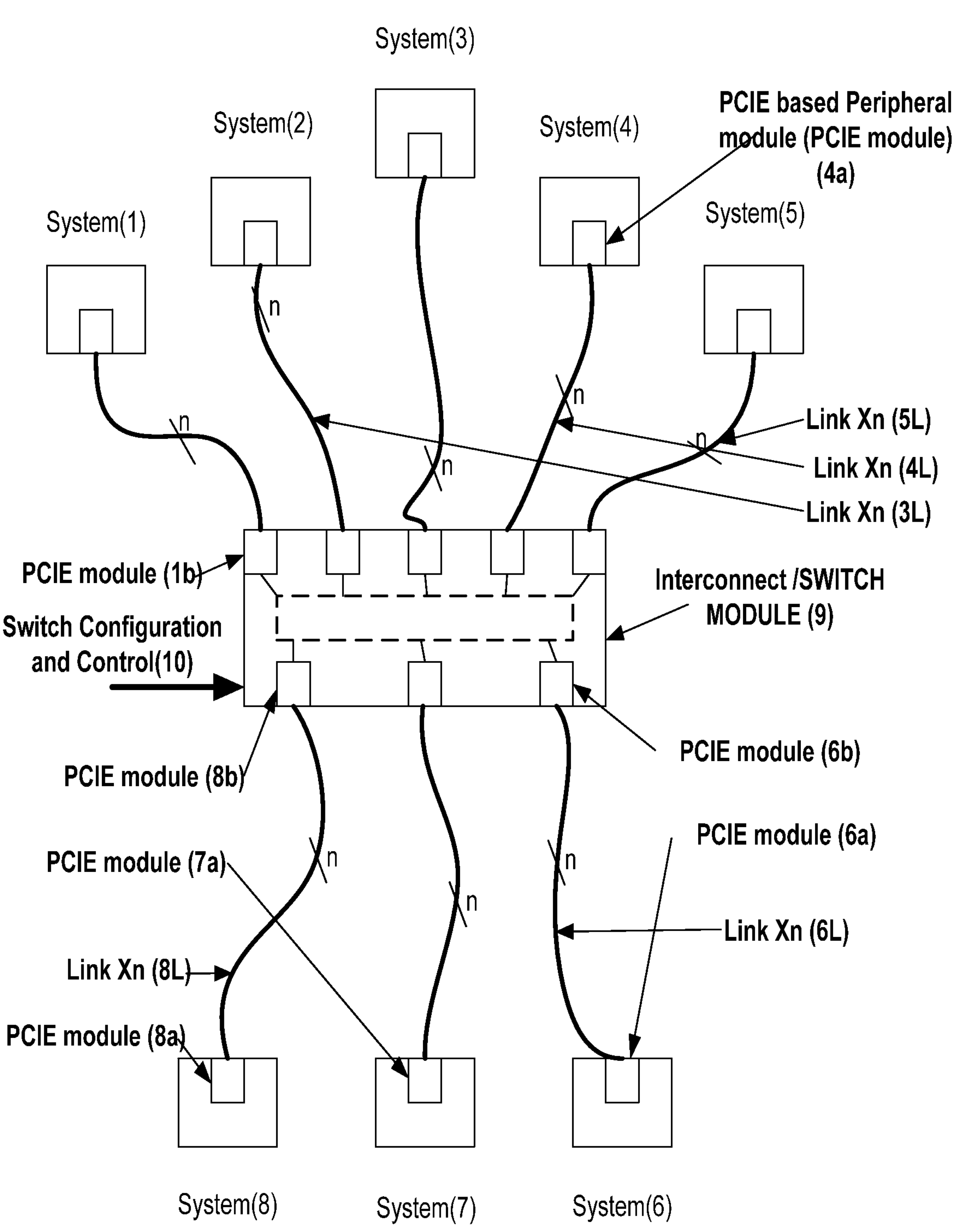
FIG. 1 Typical Interconnected (multi-system) cluster (shown with eight systems connected in a star architecture using direct connected data links between PCIE standard based peripheral to PCIE standard based peripheral)

FIG. 1 is a typical cluster interconnect. The Multi-system cluster shown consist of eight units or systems {(1) to (8)} that are to be interconnected. Each system is PCI Express (PCIE) based system with a PCIE root complex for control of data transfer to and from connected peripheral devices via PCIE peripheral modules as is standard for PCIE based systems. Each system to be interconnected has at least a PCIE based peripheral module {(1*a*) to (8*a*)} as an IO module, at the interconnect port enabled for system interconnection, with n-links built into or attached to the system. (9) is an interconnect module or a switch sub-system, which has number of PCIE based connection modules equal to or more than the number of systems to be interconnected, in this case of FIG. 1 this number being eight {(1*b*) to (8*b*)}, that can be interconnected for data transfer through the switch. A software based control input is provided to configure and/or control the operation of the switch and enable connections between the switch ports for transfer of data. Link connections {(1L) to (8L)} attach the PCIE based peripheral modules 1*a* to 8*a*, enabled for interconnection on the respective systems 1 to 8, to the on the switch with n links. The value of n can vary depending on the connect band width required by the system.

When data has to be transferred between say system 1 and system 5, in the simple case, the control is used to establish an internal link between PCIE based peripheral modules 1*b* and 5*b* at the respective ports of the switch. A hand shake is established between outbound communication enabled PCIE based peripheral module (PCIE Module) la and inbound PCIE module 1*b* at the switch port and outbound PCIE module 5*a* on the switch port and inbound communication enabled PCIE module 5*b*. This provides a through connection between the PCIE modules 1*a* to 5*b* through the switch allowing data transfer. Data can then be transferred at speed between the modules and hence between systems. In more complex cases data can also be transferred and queued in storage implemented in the switch, at the ports and then when links are free transferred out to the right systems at speed.

Multiple systems can be interconnected at one time to form a multi-system that allow data and information transfer and sharing through the switch. It is also possible to connect smaller clusters together to take advantage of the growth in system volume by using an available connection scheme that interconnects the switches that form a node of the cluster.

If need for higher bandwidth and low latency data transfers between systems increase, the connections can grow by increasing the number of links connecting the PCIE modules between the systems in the cluster and the switch without completely changing the architecture of the interconnect. This scalability is of great importance in retaining flexibility for growth and scaling of the cluster.

It should be understood that the system may consist of peripheral devices, storage devices and processors and any other communication devices. The interconnect is agnostic to the type of device as long as they have a PCIE module at the port to enable the connection to the switch. This feature will reduce the cost of expanding the system by changing the switch interconnect density alone for growth of the multi-system.

PCIE is currently being standardized and that will enable the use of the existing PCIE modules to be used from different vendors to reduce the over all cost of the system. In addition using a standardized module in the system as well as the switch will allow the cost of software development to be reduced and in the long run use available software to configure and run the systems.

As the expansion of the cluster in terms of number of systems, connected, bandwidth usage and control will all be cost effective, it is expected the over all system cost can be reduced and over all performance improved by standardized PCIE module use with standardized software control.

Typical connect operation may be explained with reference to two of the systems, example system (1) and system (5). System (1) has a PCIE module (1*a*) at the interconnect port and that is connected by the connection link or data-link or link (1L) to a PCIE module (1*b*) at the IO port of the switch (9). System (5) is similarly connected to the switch trough the PCIE module (5*a*) at its interconnect port to the PCIE module (5*b*) at the switch (9) IO port by link (5L). Each PCIE module operates for transfer of data to and from it by standard PCI Express protocols, provided by the configuration software loaded into the PCIE modules and switch. The switch operates by the software control and configuration loaded in through the software configuration input.

Figure 2:
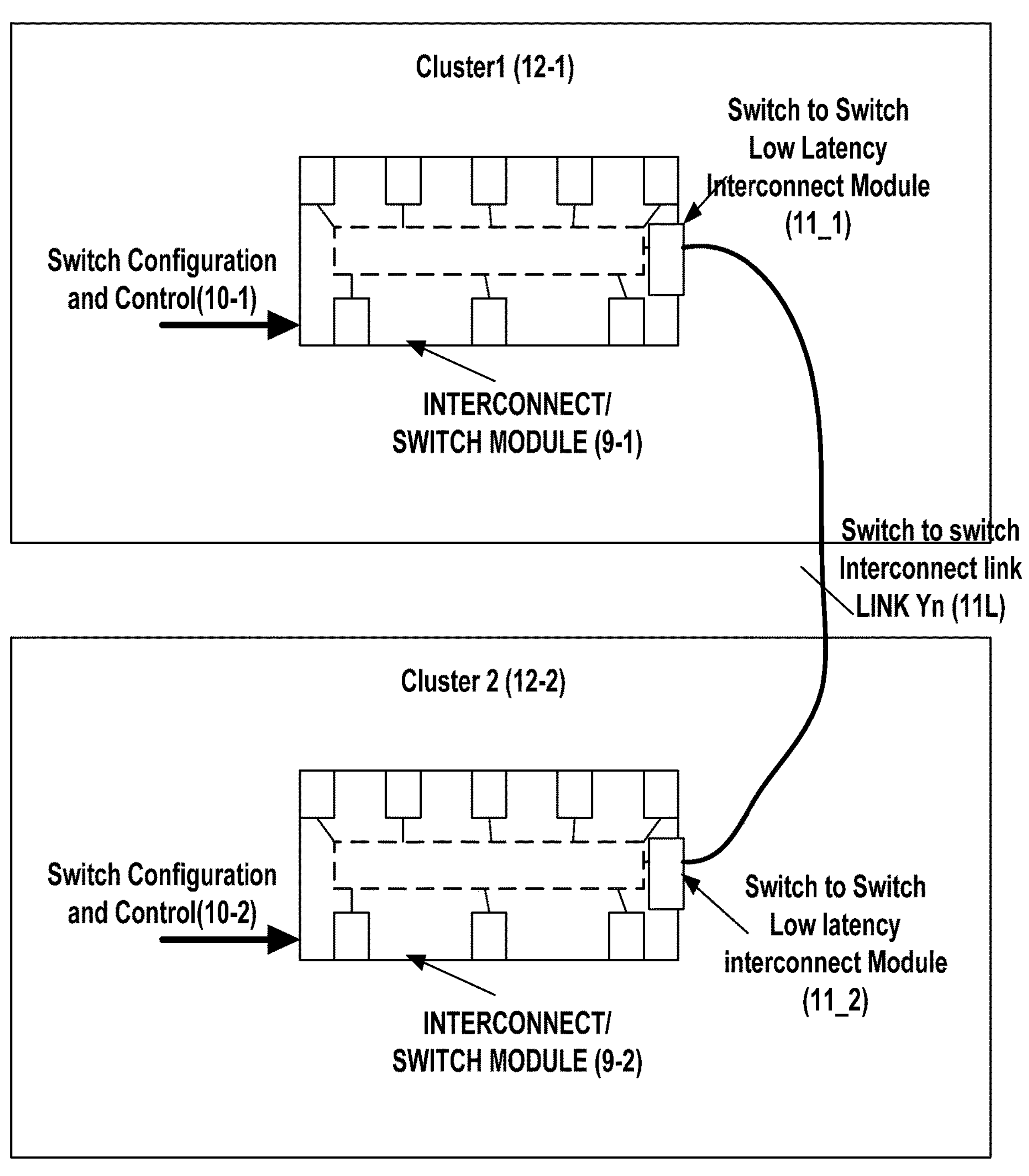
FIG. 2—is a cluster using multiple interconnect modules or switches to interconnect smaller clusters.

FIG. 2 is that of a multi-switch cluster. As the need tom interconnect larger number of systems increase, it will be optimum to interconnect multiple switches of the clusters to form a new larger cluster. Such a connection is shown in FIG. 2. The shown connection is for two smaller clusters (12-1 and 12-2) interconnected using PCIE modules that can be connected together using any low latency switch to switch connection (11-10 and 11-2), connected using interconnect links (11L) to provide sufficient band width for the connection. The switch to switch connection transmits and receives data and information using any suitable protocol and the switches provide the interconnection internally through the software configuration loaded into them.

The following are some of the advantages of the disclosed interconnect scheme 1. Provide a low latency interconnect for the cluster. 2. Use of PCI Express based protocols for data and information transfer within the cluster. 3. Ease of growth in bandwidth as the system requirements increase by increasing the number of links within the cluster. 4. Standardized PCIE component use in the cluster reduce initial cost. 5. Lower cost of growth due to standardization of hardware and software. 6. Path of expansion from a small cluster to larger clusters as need grows. 7. Future proofed system architecture. 8. Any speed increase in the link connection due to technology advance is directly applicable to the interconnection scheme.

In fact the disclosed interconnect scheme provides advantages for low latency multi-system cluster growth that are not available from any other source.

While the invention has been described in terms of several embodiments, those of ordinary skill in the art will recognize that the invention is not limited to the embodiments described, but can be practiced with modification and alteration within the spirit and scope of the appended claims. Multiple existing methods and methods developed using newly developed technology may be used to establish the hand shake between systems and to improve data transfer and latency. The description is thus to be regarded as illustrative instead of limiting and capable of using any new technology developments in the field of communication an data transfer. There are numerous other variations to different aspects of the invention described above, which in the interest of conciseness have not been provided in detail. Accordingly, other embodiments are limited only within the scope of the claims.

What is claimed is:

1. A system, the system comprising:

an independently configured and controlled network switch sub-system for interconnecting a plurality of peripheral component interconnect express (PCIE) enabled computers, processing systems and embedded systems in a cluster using PCIE protocol over a respective plurality of PCIE links of a respective connection of each of the PCIE enabled computers, processing systems and embedded systems, wherein a respective band-width of each respective connection is determined by a respective number of PCIE links of the respective connection;

the independently configured and controlled network switch sub-system device comprising a network switch;

the network switch sub-system further comprising a control input coupled to the network switch for software configuration and control of the network switch and to enable software configuration and control for connection between the plurality of ports of the network switch;

the network switch having a plurality of connection modules; wherein each connection module is at one respective port of the plurality of ports of the network switch, wherein the control input coupled to the network switch is used to establish internal links between the plurality of connection modules at the respective ports of the plurality of ports of the network switch for communication and data transfer between the plurality of PCIE enabled computers, processing systems and embedded systems interconnected in the cluster;

the plurality of ports comprising connection modules that comprise inbound peripheral modules at respective ports, wherein the inbound peripheral modules at the respective ports are equal or more in number than the number of PCIE enabled computers, processing systems and embedded systems interconnected in the cluster using the network switch;

each of the PCIE enabled computers, processing systems and embedded systems comprises at least a root complex at an apex of a PCIE bus system which controls all connections and data transfers over the PCIE bus system including to and from connected PCIE based peripheral modules at end points of the PCIE bus system;

wherein each of the PCIE enabled computers, processing systems and embedded systems that are interconnected in the cluster comprises a PCIE based peripheral module as an (input-output) i/o module, enabled for system interconnection, at a respective port, at each respective end point of the PCIE bus of each of the PCIE enabled computers, processing systems and embedded systems to be interconnected in the cluster;

each of the PCIE based Peripheral modules enabled for system interconnection at the respective port at the respective end point of the PCIE bus of each of the PCIE enabled computers, processing systems and embedded systems interconnected in the cluster is respectively connected to one of the inbound peripheral modules at the respective ports of the network switch using the respective plurality of PCIE links of the respective connection.

2. The system of claim 1, wherein software is directly loaded into the network switch and enables the network switch device to connect between the inbound peripheral modules at the respective ports of the network switch for data transfer between the interconnected PCIE enabled computers, processing systems and embedded systems interconnected in the cluster through the network switch.

3. The system of claim 2, wherein the data transfer between each of the inbound peripheral modules of the network switch at the ports of the network switch connected using the respective plurality of PCIE links of the respective connection to one PCIE based peripheral module enabled for system interconnection at the respective end point of the PCIE bus of each of the PCIE enabled computers, processing systems and embedded systems interconnected in the cluster enable data transfer between the interconnected cluster of computers, processing systems and embedded systems.

4. The system of claim 1, wherein the network switch sub-system is connected to each of the PCIE enabled computers, processing systems and embedded systems, that are interconnected in the cluster via the connection between one of the inbound Peripheral modules at one port of the network switch connecting to the PCIE based peripheral module enabled for interconnection at the end point of the PCIE bus of each of the PCIE enabled computers, processing systems and embedded systems using the respective plurality of PCIE links of the respective connection between the respective peripheral modules.

5. The system of claim 4, wherein the respective connection between the network switch and each of the PCIE enabled computers, processing systems and embedded systems, interconnected in the cluster is via the respective connection between the PCIE based peripheral module enabled for system interconnection of the PCIE enabled computers, processing systems and embedded systems and one of the inbound peripheral modules at the respective ports of the network switch using PCIE protocol over the respective plurality of PCIE links of the respective connection.

* * * * *